United States Patent
Goodrum et al.

(10) Patent No.: US 9,811,141 B2
(45) Date of Patent: Nov. 7, 2017

(54) POWER CAPPING FEEDBACK NORMALIZATION

(71) Applicant: Hewlett Packard Enterprise Development LP, Houston, TX (US)

(72) Inventors: Alan Goodrum, Houston, TX (US); Zhikui Wang, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 16 days.

(21) Appl. No.: 14/812,460

(22) Filed: Jul. 29, 2015

(65) Prior Publication Data

US 2015/0331470 A1 Nov. 19, 2015

Related U.S. Application Data

(63) Continuation of application No. 13/386,639, filed as application No. PCT/US2012/028140 on Mar. 24, 2010, now Pat. No. 9,134,783.

(51) Int. Cl.
| | |
|---|---|
| G06F 1/00 | (2006.01) |
| G06F 1/26 | (2006.01) |
| G06F 1/32 | (2006.01) |
| G06F 1/28 | (2006.01) |

(52) U.S. Cl.
CPC .............. *G06F 1/3203* (2013.01); *G06F 1/28* (2013.01); *G06F 1/3206* (2013.01); *G06F 1/3234* (2013.01); *G06F 1/26* (2013.01)

(58) Field of Classification Search
CPC .................................... G06F 1/32; G06F 1/26
See application file for complete search history.

(56) References Cited

U.S. PATENT DOCUMENTS

| | | |
|---|---|---|
| 7,861,102 B1 | 12/2010 | Ranganathan et al. |
| 2005/0015631 A1 | 1/2005 | McDonald et al. |
| 2005/0262364 A1 | 11/2005 | Diab et al. |

(Continued)

FOREIGN PATENT DOCUMENTS

| | | |
|---|---|---|
| CN | 1069134 A | 2/1993 |
| CN | 101154818 A | 4/2008 |

(Continued)

OTHER PUBLICATIONS http://www.researchgate.net, "Feedback Control Algorithms for Power Management of Servers"; 6 pages, Dated Jun. 2008.

(Continued)

*Primary Examiner* — Phil Nguyen
(74) *Attorney, Agent, or Firm* — Tarolli, Sundheim, Covell & Tummino L.L.P.

(57) ABSTRACT

A power capping system (10) and method (200) are provided. In one embodiment, a power capping system (10) includes a power controller (16) configured to calculate an error between a predefined maximum desired power and a power feedback signal associated with actual power consumption of a server (12) and to provide a power capping signal that substantially limits the power consumption of the server (12) based on a predetermined gain constant and the error. The system also includes a management interface (18) configured to generate a normalization factor based on the power feedback signal. The normalization factor can be implemented to normalize the error.

14 Claims, 3 Drawing Sheets

(56) References Cited

U.S. PATENT DOCUMENTS

| | | | |
|---|---|---|---|
| 2005/0281300 A1* | 12/2005 | Li | H01S 5/0683 |
| | | | 372/38.04 |
| 2006/0206740 A1 | 9/2006 | Hurd | |
| 2008/0320322 A1 | 12/2008 | Green et al. | |
| 2009/0119523 A1 | 5/2009 | Totten | |
| 2009/0125293 A1 | 5/2009 | Lefurgy et al. | |
| 2009/0125737 A1 | 5/2009 | Brey et al. | |
| 2009/0190647 A1 | 7/2009 | Utsunomiya et al. | |
| 2010/0121511 A1* | 5/2010 | Onnerud | B60L 11/1851 |
| | | | 701/22 |
| 2010/0332872 A1 | 12/2010 | Hanson et al. | |
| 2011/0119514 A1 | 5/2011 | Kim et al. | |
| 2011/0144818 A1 | 6/2011 | Li et al. | |
| 2011/0320846 A1 | 12/2011 | David et al. | |

FOREIGN PATENT DOCUMENTS

| | | |
|---|---|---|
| DE | 3837071 | 2/1990 |
| DE | 112008004030 | 9/2011 |
| EP | 2083516 A1 | 7/2009 |
| KR | 1020090084541 | 8/2009 |
| KR | 1020100027647 | 3/2010 |

OTHER PUBLICATIONS

International Searching Authority, International Search Report and the Written Opinion, Dec. 22, 2010, 9 pages.
Office Action cited in Appl. No. 112010003170.3; dated Nov. 6, 2013; 8 pages.
Extended European Search Report received in EP Application No. 10848589.7, dated Feb. 15, 2017, 7 pages.

* cited by examiner

POWER CAPPING FEEDBACK NORMALIZATION

The present application claims priority from and is a continuation application of U.S. Ser. No. 13/386,639 with a filing date of 23 Jan. 2012, which claims priority to PCT/US2010/0281407 with a filing date of 24 Mar. 2010, which are both herein incorporated by reference in their entirety.

BACKGROUND

Power capping is a process in which a power capping signal is provided to a server to substantially limit the power consumption of the server by throttling one or more processors and/or memory components. Power capping fast enough to protect circuit breakers can require a fast-acting power capping controller that utilizes closed-loop feedback control. However, adjusting a gain of the closed-loop feedback control can be complicated. As an example, a gain that is too low can result in the controller's response being too slow, and a gain that is too high can result in oscillation of the power capping that may not settle.

DETAILED DESCRIPTION

Figure 1:
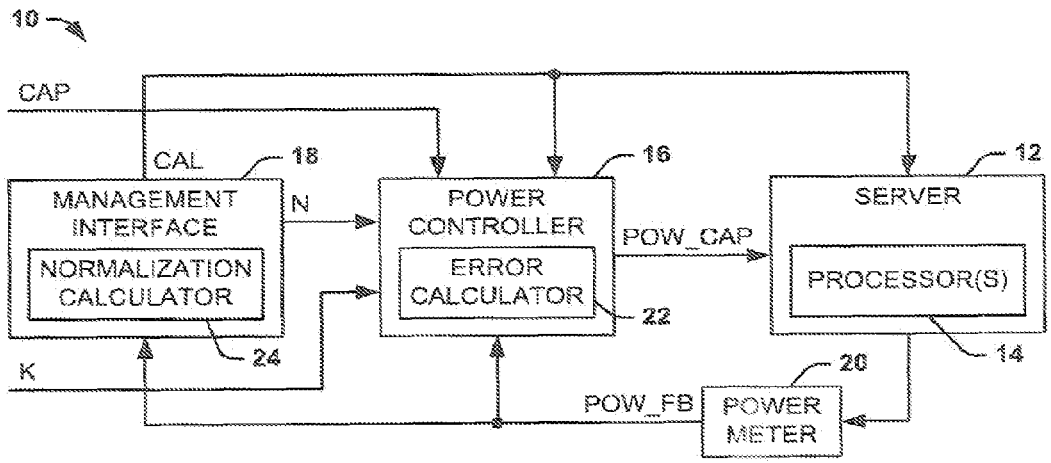
FIG. 1 illustrates an example embodiment of a power capping system.

FIG. 1 illustrates an example of a power capping system 10. The power capping system 10 can be implemented to substantially limit a power consumption associated with a server 12 that includes one or more processors 14. As an example, the server 12 could also include one or more memory devices (not shown), as well, such as one or more dual in-line memory modules (DIMMs).

The power capping system 10 includes a power controller 16 and a management interface 18. The power controller 16 can implement a control loop to generate a power capping signal POW_CAP that is provided to the server 12 to substantially limit the power consumption of the server 12. Specifically, the power controller 16 can set a control percentage of the power capping signal POW_CAP that can set the processors 14 in the server 12 to a low-processing state, such as by lowering a power voltage and/or slowing down a processor clock signal. As an example, the power capping signal POW_CAP can be a PROCHOT# signal, and the power capping control percentage can be a duty-cycle associated with the power capping signal POW_CAP. As another example, the power capping signal POW_CAP could initiate a sequence that writes to specific control registers inside the processors 14 that lower the power consumption of the processors 14, such as by lowering power voltage and/or speed.

To generate the power capping signal POW_CAP, the power controller 16 monitors an actual power consumption of the server 12 via a power feedback signal POW_FB that is generated by a power meter 20. The power controller 16 includes an error calculator 22 that is configured to calculate an amount of error between the power feedback signal POW_FB and a predefined maximum desired power that is specified by a signal CAP. As an example, the signal CAP can define a user specified maximum desired operating power associated with the server 12. The error that is calculated by the error calculator 22 can be multiplied by a predetermined gain constant K that is provided to the power controller 16, and the result can be integrated and modulated to set the control percentage of the power capping signal POW_CAP. As an example, the modulation can be pulse-width modulation to set a duty-cycle of the power capping signal POW_CAP.

The management interface 18 can be an embedded server interface, such as an Integrated Lights Out (iLO) management interface. The management interface 18 includes a normalization calculator 24 that is configured to provide a normalization factor N to the power controller 16 to normalize the error that is calculated by the error calculator 22. As an example, the predetermined gain constant K can be generated for a plurality of different servers, including the server 12, that all have different functionality, and thus power consumption demands. Thus, the error that is calculated by the error calculator 22 can be normalized to accommodate the specific power consumption demands of the server 12 such that the predetermined gain constant K can remain common to the set of all servers.

The management interface 18 can be configured to initiate a calibration procedure that is signaled to the power controller 16 and the server 12 via a signal CAL, such as subsequent to manufacture of the server 12 and/or at start-up of the server 12. During the calibration procedure, the management interface 18 can command the server 12 to run a processing intense program, such that the power consumption of the server 12 is substantially maximized independently of the power capping signal POW_CAP. As an example, the processing intense program can include a series of dummy floating-point calculations and/or other processing operations that substantially maximize processing capability of the server 12. The management interface 18 can then adjust the control percentage of the power capping signal POW_CAP between a first value and a second value. As an example, the first value can be approximately 0% (i.e., full power) and the second value can be approximately 100% (i.e., full power capping). The management interface 18 can thus measure the actual power consumption of the server 12 at each of the separate control percentage values of the power capping signal POW_CAP and calculate a difference to generate the normalization factor N. Accordingly, the power controller 16 can set the control percentage of the power capping signal POW_CAP based on the error calculated by the error calculator 22 and a factor associated with the normalization factor N and the predetermined gain constant K.

It is to be understood that the power capping system 10 is not intended to be limited to the example of FIG. 1. As an example, the features associated with the power controller 16 and/or the management interface 18 can be implemented as software or a combination of hardware and software. In addition, at least one of the power controller 16 and the management interface 18 can be configured in or in a portion of an integrated circuit (IC). As another example, the predetermined gain constant K can be provided to the management interface 18 instead of the power controller 16. As an example, the power controller 16 may be configured with substantial limited processing capability, such as to prevent certain arithmetic operations (e.g., division). Thus, the management interface 18 could be configured to provide the normalization factor N as a factor that also includes the predetermined gain constant K, as described in greater detail in the example of FIG. 3 below. Thus, the power capping system 10 can be configured in a variety of ways.

Figure 2:
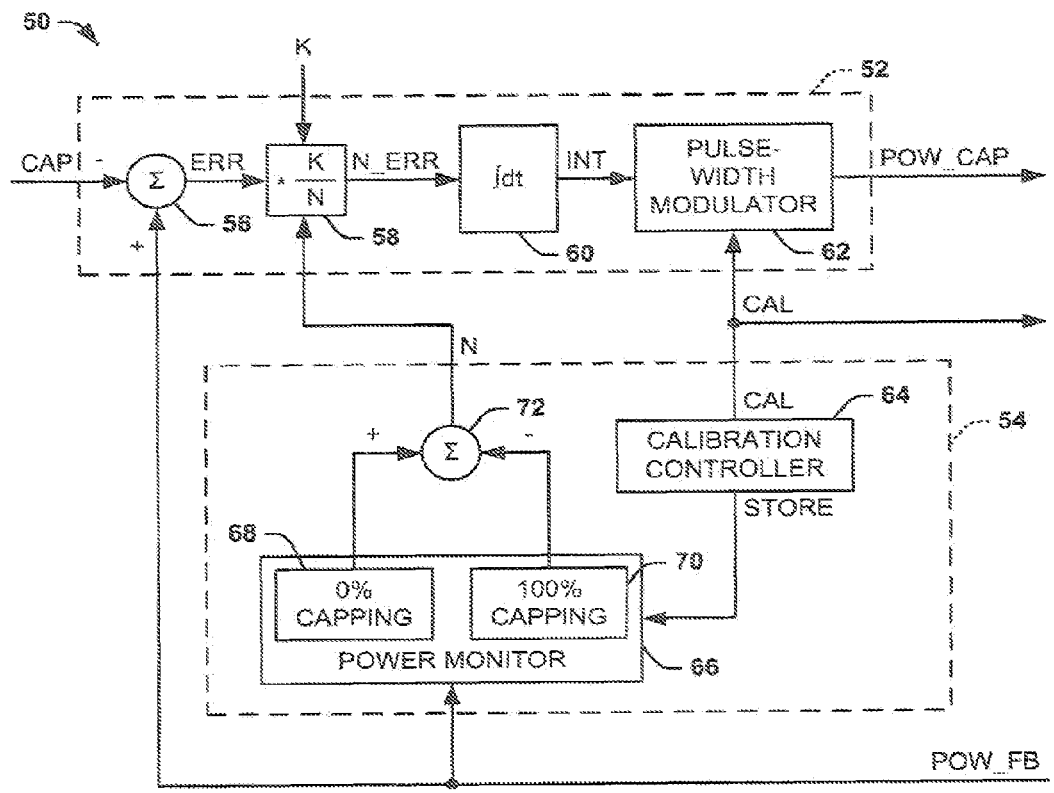
FIG. 2 illustrates another example embodiment of a power capping system.

FIG. 2 illustrates another example embodiment of a power capping system 50. As an example, the power capping system 50 can represent a portion of the power capping system 10 in the example of FIG. 1. The power capping system 50 includes a power controller 52 and a management interface 54.

Similar to as described above in the example of FIG. 1, the power controller 52 implements a control loop to generate a power capping signal POW_CAP that is provided to a server (not shown) to substantially limit the power consumption of the server. The power controller 52 includes a summation component 56 that is configured to subtract a signal CAP from a power feedback signal POW_FB that corresponds to the actual power consumption of the server. As an example, the signal CAP can define a user specified maximum desired operating power associated with the server. The summation component 56 thus outputs an error factor ERR corresponding to an error associated with the power feedback signal POW_FB, and thus the actual power consumption of the server, relative to the signal CAP.

The error factor ERR is provided to an arithmetic unit 58 that is configured to multiply the error represented by the error factor ERR by a factor that is associated with a predetermined gain constant K and a normalization factor N. Specifically, the arithmetic unit 58 is configured to multiply the error factor ERR by the predetermined gain constant K and to divide the result by the normalization factor N. As an example, the predetermined gain constant K can be a gain constant that is calculated for a plurality of servers, such that the predetermined gain constant K can be common to each of the plurality of servers. The normalization factor N can be generated by the management interface 54, as described in greater detail below. Thus, by dividing the product of the error factor ERR and the predetermined gain constant K by the normalization factor N, the error factor ERR is normalized to implement power capping in a manner that is specific to the server. The normalized error is output from the arithmetic component 58 as a normalized error factor N_ERR.

The normalized error factor N_ERR is provided to an integrator 60 that is configured to integrate the normalized error with respect to previous values of error. The integrated error INT is output from the integrator 60 to a pulse-width modulator 62 that is configured to set a duty-cycle of the power capping signal POW_CAP based on the integrated error INT. Specifically, the pulse-width modulator 62 pulse-width modulates the power capping signal POW_CAP to set a pulse-width that is inversely proportional to the power consumption of the server.

The management interface 54 can be configured, for example, as an embedded server interface. The management interface 54 includes a calibration controller 64 that provides a calibration signal CAL to initiate a calibration procedure. As an example, the calibration signal CAL in the example of FIG. 2 can correspond to one or more signals and/or software code sequences that are activated to initiate the calibration procedure. The calibration signal CAL can be provided to the server to initiate a processing intense program, such that the power consumption of the server is substantially maximized independently of the power capping signal POW_CAP. As an example, the processing intense program can include a series of dummy floating-point calculations and/or other processing operations that substantially maximize processing capability of the server. The processing intense program can be stored on the server, such that the calibration signal CAL initiates execution of the processing intense program, or it can be stored on the management interface 54, such that it can be downloaded to the server via the calibration signal CAL.

The calibration signal CAL can also be provided to the pulse-width modulator 62 to adjust the duty-cycle of the power capping signal POW_CAP during the calibration procedure. As an example, prior to or subsequent to initiating the processing intense program, the calibration signal CAL can command the pulse-width modulator 62 to vary the duty-cycle of the power capping signal POW_CAP between approximately 0% (i.e., fully off) and approximately 100% (i.e., fully on). The management interface 54 also includes a power monitor 66 that is configured to monitor the magnitude of the power feedback signal POW_FB, and thus the actual power consumption of the server. The power monitor 66 can thus save the values of the power feedback signal POW_FB corresponding to when the power capping signal POW_CAP has a 0% duty-cycle, indicated by a 0% CAPPING component 68, and when the power capping signal POW_CAP has a 100% duty-cycle, indicated by a 100% CAPPING component 70. As an example, the calibration controller 64 can provide a storage signal STORE to command the power monitor 66 to store the values at the appropriate times. For example, the storing of the values of the power feedback signal POW_FB can be delayed for a predetermined amount of time after the duty-cycle of the power capping signal POW_CAP is set to 0% and 100%, respectively, based on the storage command provided by the storage signal STORE.

The management interface 54 also includes a summation component 72 that is configured to subtract the value of the power feedback signal POW_FB at 100% duty-cycle of the power capping signal POW_CAP from the value of the power feedback signal POW_FB at 0% duty-cycle of the power capping signal POW_CAP. The result is the normalization factor N corresponding to the difference between a minimum power consumption and a maximum power consumption of the server. Thus, the normalization factor N is implemented to normalize the error that is calculated in the power controller 52, such that the predetermined gain constant K can be common to a plurality of servers, such as a plurality of servers that are manufactured/tested/validated together. As a result, each of the individual servers do not have to be individually tuned to calculate respective individual gain constants.

It is to be understood that the power capping system 50 is not intended to be limited to the example of FIG. 2. As an example, the features associated with the power controller 52 and/or the management interface 54 can be implemented as software or a combination of hardware and software. In addition, at least one of the power controller 52 and the management interface 54 can be configured in or in a portion of an integrated circuit (IC). As yet another example, the calculation of the normalization factor N can occur in real-time instead of during a calibration procedure. For example, the power monitor 66 may monitor the power feedback signal POW_FB at various values of the duty-cycle of the power capping signal POW_CAP to update the normalization factor N. In addition, it is to be understood that the management interface 54 is not limited to setting the duty-cycle of the power capping signal POW_CAP to 100% and 0% in generating the normalization factor N, but could use other values, instead, to extrapolate the normalization factor N.

Also, although the example of FIG. 2 demonstrates that the predetermined gain constant K is provided to the power controller 52, it is to be understood that the management interface 54 could be configured to provide the predetermined gain constant K to the power controller 52, or could be configured to provide the normalization factor N as a factor that also includes the predetermined gain constant K, as described in greater detail in the example of FIG. 3 below. As yet another example, it is to be understood that there are a variety of different ways that the power capping signal POW_CAP can be generated, such that the power capping signal POW_CAP is not limited to being integrated and/or pulse-width modulated, as demonstrated in the example of FIG. 2, but could be generated from a general Proportional/Integral/Derivative (PID) controller. For example, the control percentage of the power capping signal POW_CAP can be a range of analog magnitudes of the power capping signal POW_CAP instead of a duty-cycle. Furthermore, it is to be understood that there are a variety of ways that the error can be normalized in the example of FIG. 2. For example, the normalization factor can be arithmetically applied to data factors other than the predetermined gain constant K and/or the error factor ERR, such as the power feedback signal POW_FB or the power capping signal POW_CAP. Thus, the power capping system 50 can be configured in a variety of ways.

Figure 3:
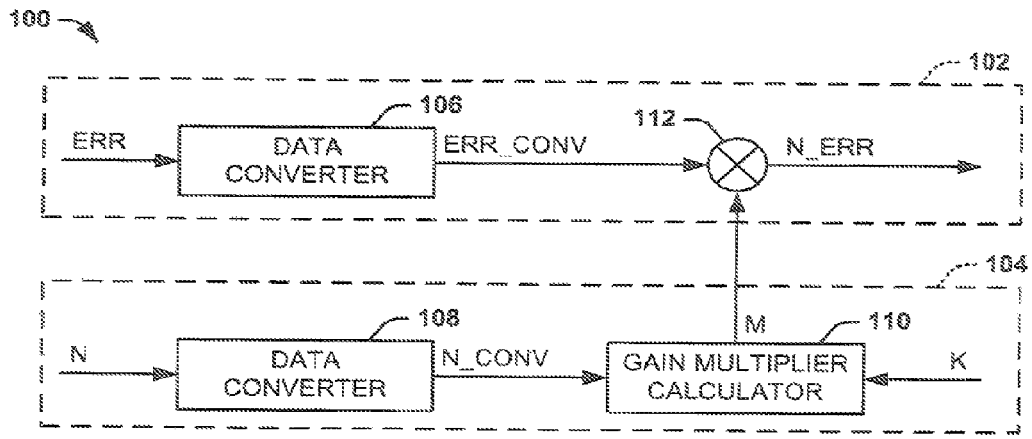
FIG. 3 illustrates an example embodiment of a data conversion system in a power capping system.

FIG. 3 illustrates an example embodiment of a data conversion system 100 in a power capping system. As an example, the data conversion system 100 can be implemented in the power capping system 10 in the example of FIG. 1 or the power capping system 50 in the example of FIG. 2. Therefore, reference is to be made to the examples of FIGS. 1 and 2 in the following description of FIG. 3.

The data conversion system 100 includes a power controller 102 and a management interface 104. As an example, the power controller 102 and the management interface 104 can correspond to the power controller 52 and the management interface 54 in the example of FIG. 2. However, it is to be understood that, in the example of FIG. 3, the power controller 102 and the management interface 104 are demonstrated simplistically. As such, only a portion of each device is demonstrated in the example of FIG. 3. In the example of FIG. 3, the power controller 102 and the management interface 104 can be configured as dissimilar bit-processors, such as with respect to certain mathematical operations (e.g., multiplication/division). As such, data conversion may be necessary with respect to the arithmetic calculations, such as calculation of the error factor ERR and the normalization factor N, that are performed between the two devices. For example, the power controller 102 can be configured as an 8-bit processor that is unable to perform division, and the management interface 104 can be configured as a 32-bit processor.

The power controller 102 includes a data converter 106 that converts the error factor ERR to a converted error factor ERR_CONV. As an example, the data converter 106 truncates the error factor ERR to a binary floating point number with a lesser number of bits. Specifically, the error factor ERR can be generated as an unsigned integer (e.g., 18-bit) that could have a negative value. The data converter 106 can thus convert the error factor ERR into a form $\epsilon \times 2^i$, where $\epsilon$ can be an integer significand of lesser bits (e.g., 7-bit) and the $2^i$ term is indicative of the magnitude of the converted error factor ERR_CONV with respect to the bit-range of the error factor ERR. Thus, truncating the error factor ERR to 7-bits introduces only approximately $\frac{1}{128}$ (0.8%) or less error in the subsequent calculations.

Similarly, the management interface 104 includes a data converter 108 that converts the normalization factor N to a converted normalization factor N_CONV. As an example, the data converter 108 truncates the normalization factor N to a binary floating point number with a lesser number of bits. Specifically, the normalization factor N can be generated as an unsigned integer (e.g., 14-bit). The data converter 108 can thus convert the normalization factor N into a form $n \times 2^j$, where n can be an integer significand of lesser bits (e.g., 9-bit) and the $2^j$ term is indicative of the magnitude of the converted normalization factor N_CONV with respect to the bit-range of the normalization factor N.

The management interface 104 includes a gain multiplier calculator 110 that is configured to multiply the converted normalization factor N_CONV with the predetermined gain constant K. As an example, the power controller 106 may be configured as a processor with lesser processing capabilities relative to the management interface 104. Thus, the power controller 102 may not be able to perform division. Thus, the division of the error and the predetermined gain factor K by the normalization factor N (i.e., the converted normalization factor N_CONV) may be performed in the management interface 104, particularly by the gain multiplier calculator 110. Thus, the gain multiplier calculator 110 generates a gain factor M that includes the component of the predetermined gain factor K. In particular, the gain multiplier calculator 110 can convert the predetermined gain factor K into a factor $k \times 2^{-4}$, and can calculate a factor $m=(k \times 2^{11})/n$. Thus, the gain factor M can be equal to $(K \times 2^{10})/N$, or $m \times 2^{-j-5}$. As such, the gain factor M can be multiplied by the converted error factor ERR_CONV by a multiplier 112 to generate the normalized error N_ERR in the power controller 102. Accordingly, the normalized error N_ERR can be equal to $m \times 2^{-j-5}$.

It is to be understood that the data conversion system 100 is not intended to be limited to the example of FIG. 3. As an example, depending on the complexity of the server and/or one or both of the power controller 102 and the management interface 104, the data converter 106 or the data converter 108 may be omitted. Specifically, the example of FIG. 3 demonstrates that a normalized error N_ERR can be calculated despite the power controller 102 and the management interface 104 being configured as dissimilar bit-processors. Thus, one or both of the data converters 106 and 108 can be omitted depending on the similarity of processing capability of the server, the power controller 102, and/or the management interface 104. Accordingly, the data conversion system can be configured in a variety of ways.

Figure 4:
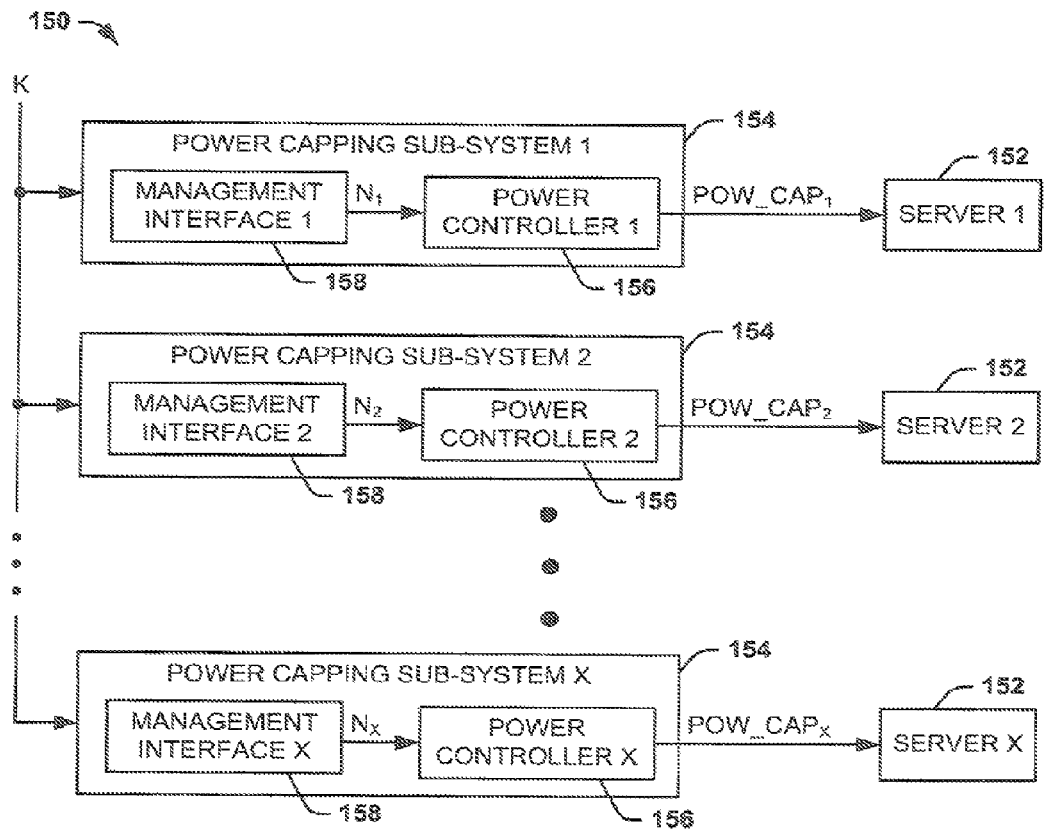
FIG. 4 illustrates yet another example embodiment of a power capping system.

FIG. 4 illustrates yet another example embodiment of a power capping system 150. The power capping system 150 can be implemented to substantially limit a power consumption associated with a plurality of servers 152, demonstrated in the example of FIG. 4 as SERVER 1 through SERVER X, where X is an integer greater than one, that each include one or more processors and/or memory devices (not shown). As an example, the servers 152 can each provide separate and distinct processing capabilities and resources, and can thus each consume separate and distinct ranges of power.

The power capping system 150 includes a respective plurality of power capping sub-systems 154 that provide power capping capability to each of the plurality of servers 152. Each of the power capping sub-systems 154 can be configured substantially similar to the power capping systems 10 and 50 in the examples of FIGS. 1 and 2. Specifically, each of the power capping sub-systems 154 includes a power controller 156 and a management interface 158. The power controller 156 can implement a control loop to generate a power capping signal $POW\_CAP_1$ through $POW\_CAP_X$ that is provided to a respective one of the servers 152 to substantially limit the power consumption of the server 152. The power capping signals $POW\_CAP_1$ through $POW\_CAP_X$ can have a control percentage that is set based on an error of power feedback associated with the respective one of the servers 152 relative to a predetermined maximum desired power and a predetermined gain factor K. The management interface 158 is configured to generate a normalization factor $N_1$ through $N_X$ that is provided to the power controller 156 to normalize the error, similar to as described above in the examples of FIGS. 1 and 2, such as during a calibration procedure.

Because the management interface 158 of each of the power capping sub-systems 154 generates the normalization factor $N_1$ through $N_X$, the predetermined gain factor K can be provided as a single value to all of the power capping sub-systems 154. Therefore, in the example of FIG. 3, the predetermined gain factor K is not calculated separately for each of the servers 152. In other words, the servers 152 are not individually tuned, such as at a time of manufacture or fabrication, to determine specific power capping needs, but can instead be calibrated individually to normalize the error factors $N_1$ through $N_X$ for specific power capping demands.

It is to be understood that the power capping system 150 is not intended to be limited to the example of FIG. 4. As an example, one or more of the power capping sub-systems 154 can include data conversion features, such as similar to the data conversion system 100 in the example of FIG. 3, based on processing dissimilarities associated with the servers 152, the power controllers 156 and/or the management interfaces 158. As another example, the predetermined gain factor K is not limited to a single value for each of the power capping sub-systems 154, but could include two or more values for providing an amount of gain for power capping. Thus, the power capping system 150 can be configured in a variety of ways.

Figure 5:
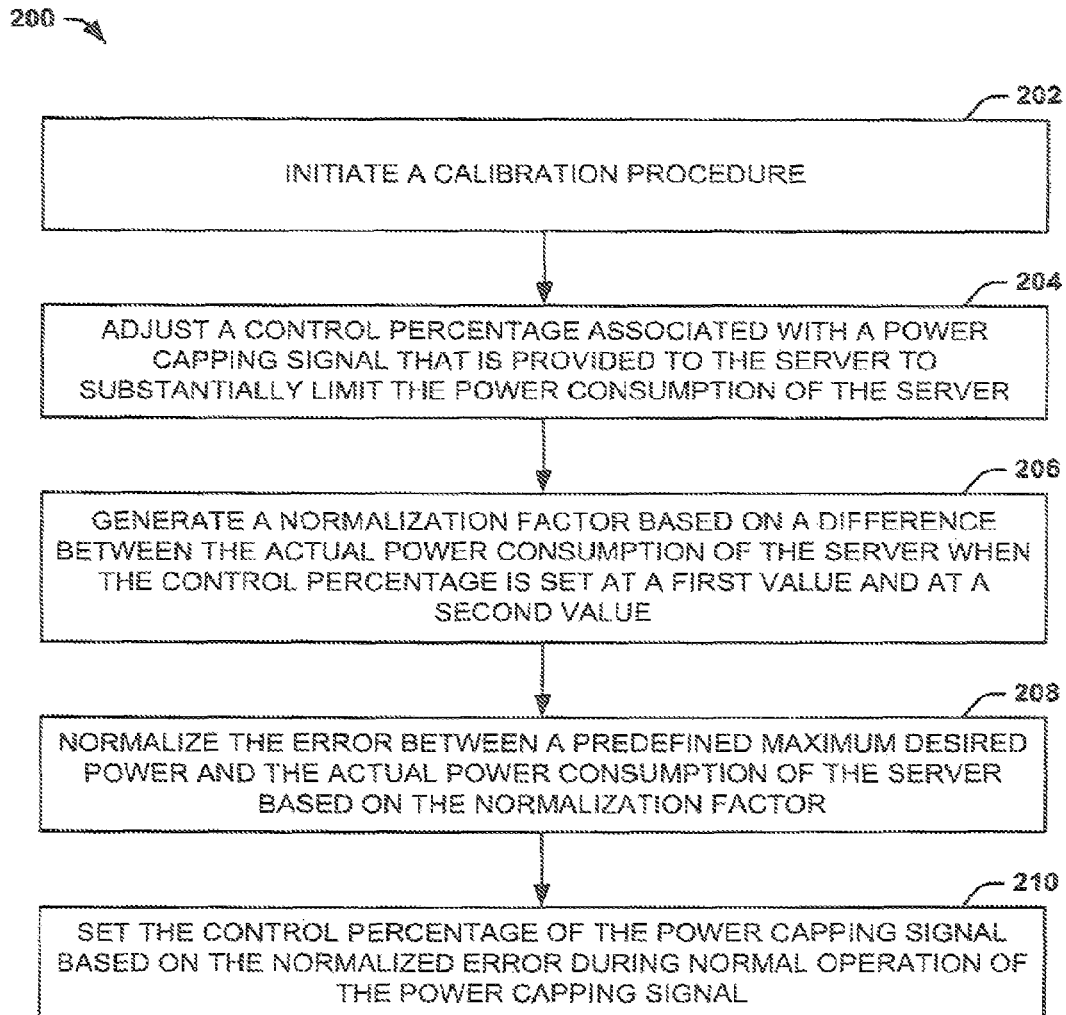
FIG. 5 illustrates an example embodiment of a method for normalizing error in a power capping system associated with a server.

In view of the foregoing structural and functional features described above, a methodology in accordance with various embodiments of the present invention will be better appreciated with reference to FIG. 5. While, for purposes of simplicity of explanation, the methodology of FIG. 5 is shown and described as executing serially, it is to be understood and appreciated that the present invention is not limited by the illustrated order, as some embodiments could, in accordance with the present invention, occur in different orders and/or concurrently with other embodiments from that shown and described herein. Moreover, not all illustrated features may be required to implement a methodology in accordance with an embodiment of the present invention.

FIG. 5 illustrates an example of a method 200 for normalizing error in a power capping system associated with a server. At 202, a calibration procedure is initiated. At 204, a control percentage associated with a power capping signal that is provided to the server to substantially limit the power consumption of the server is adjusted. At 206, a normalization factor is generated based on a difference between the actual power consumption of the server when the control percentage is set at a first value and when the control percentage is set at a second value. At 208, an error between a predefined maximum desired power and the actual power consumption of the server is normalized based on the normalization factor. At 210, the control percentage of the power capping signal is set based on the normalized error during normal operation of the power capping system.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A system comprising:
   a power controller to:
      calculate an error between a predefined maximum desired power and a power feedback signal associated with a server;
      provide a power capping signal based on the calculated error, the power capping signal characterizing a limit of power consumption of the server; and
   a management interface to adjust a control percentage associated with the power capping signal to calculate a difference in the power feedback signal between the control percentage set at a predetermined maximum and set at a predetermined minimum.

2. The system of claim 1, wherein the predetermined maximum is set at approximately 100% and the predetermined minimum is set at approximately 0 %.

3. The system of claim 1, wherein the management interface is further to initiate a calibration process to instruct the server to run a processing intense program to set a magnitude of the power feedback signal to a substantially maximum value independently of the control percentage of the power capping signal.

4. The system of claim 3, wherein the processing intense program comprises a predetermined series of processing operations to substantially maximize power consumption of the server.

5. The system of claim 1, wherein the power controller and the management interface are configured as separate processors.

6. The system of claim 1, wherein one of the power controller and the management interface are implemented on an integrated circuit (IC) chip.

7. A method comprising:
   adjusting a control percentage associated with a power capping signal that characterizes a limit of the power consumption of a server;
   instructing the server to run a processing intense program to substantially maximize power consumption of the server independently of the power capping signal;
   calculating a difference in a power feedback signal between the control percentage set at a predetermined maximum and set at a predetermined minimum; and
   setting the control percentage of the power capping signal based on the difference.

8. The method of claim 7, wherein a magnitude of the power feedback signal is set to a substantially maximum value in response to the processing intense program.

9. The method of claim 7, wherein the predetermined maximum is set at approximately 100% and the predetermined minimum is set at approximately 0%.

10. The method of claim 7, further comprising monitoring the actual power consumption of the server via the power feedback signal.

11. A system comprising:
a plurality of power controllers that are each to:
calculate an error between a predefined maximum desired power and a power feedback signal associated with one of a respective plurality of servers that each comprise at least one processor; and
provide a power capping signal to the respective one of the plurality of servers based on the calculated error, the power capping signal characterizing a limit of the power consumption of a server; and
a plurality of management interfaces that are each to calculate the difference between the respective power feedback signal in response to a control percentage associated with the respective power capping signal is set at a predetermined maximum and set at a predetermined minimum.

12. The system of claim 11, wherein each of the plurality of management interfaces is further to calculate a difference in the respective power feedback signal between the control percentage set at approximately 100% and set at approximately 0%.

13. The system of claim 11, wherein each of the plurality of management interfaces is further to instruct the respective one of the plurality of servers to run a processing intense program to set a magnitude of the respective power feedback signal to a substantially maximum value independently of the respective power capping signal.

14. The system of claim 11, wherein the plurality of power controllers are configured to operate on a given processor and the plurality of management interfaces are configured to operate on another processor.

\* \* \* \* \*